United States Patent [19]

Takeuchi

[11] 3,806,978
[45] Apr. 30, 1974

[54] WASHING BRUSH OPERATION SYSTEM FOR A CONTINUOUSLY OPERATIVE CAR WASHING APPARATUS

[75] Inventor: Shigeo Takeuchi, Nagoya, Japan

[73] Assignee: Takeuchi Tekko Kabushiki Kaisha, Nagoya-shi, Japan

[22] Filed: Nov. 9, 1972

[21] Appl. No.: 305,181

[30] Foreign Application Priority Data
May 19, 1972  Japan.................................. 47-49714

[52] U.S. Cl. ............................. 15/21 D, 15/DIG. 2
[51] Int. Cl. .............................................. B60s 3/06
[58] Field of Search............. 15/DIG. 2, 21 D, 21 E, 15/97, 53

[56] References Cited
UNITED STATES PATENTS
3,522,619  8/1970  Weigele et al...................... 15/21 D
3,688,328  9/1972  Wilkins............................... 15/21 D Primary Examiner—Edward L. Roberts
Attorney, Agent, or Firm—Eric H. Waters

[57] ABSTRACT

A washing system for a continuously operative car washing apparatus in which a plurality of brushes, in the form of side brushes and wheel brushes are in series, each is supported on the frame of the apparatus by means of a brush arm swingable around a vertical axis. Some of the brushes are swung toward their open or closed positions dependent on the swinging of another brush toward its open or closed position so as not to injure a car going ahead therebetween.

3 Claims, 10 Drawing Figures

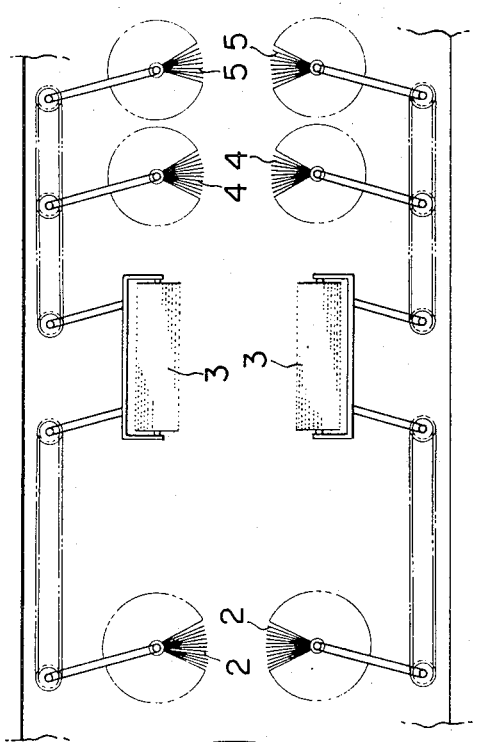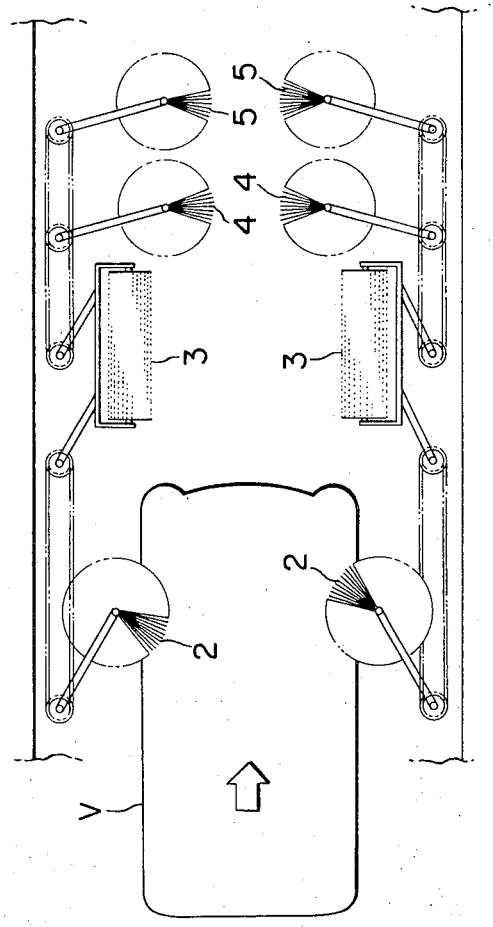
FIG. 5
FIG. 6

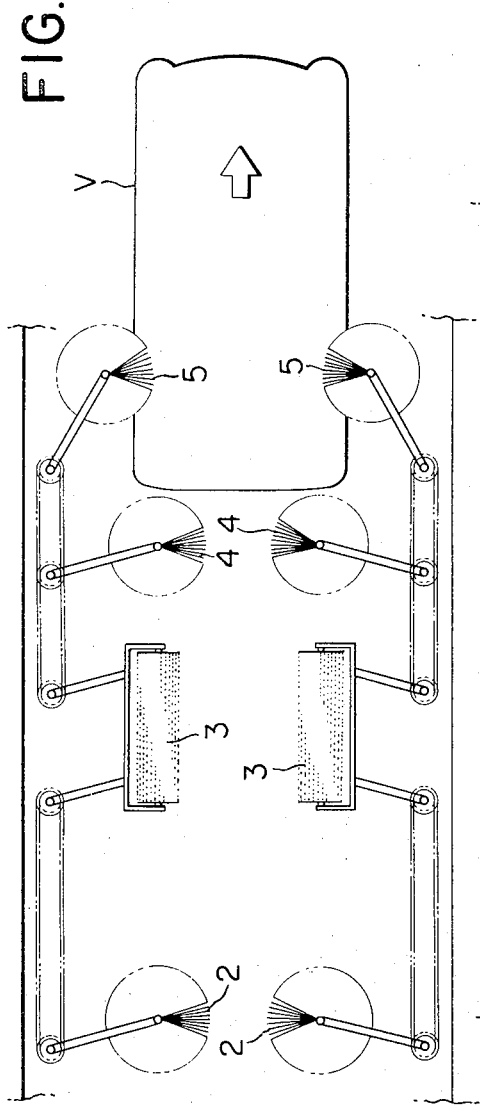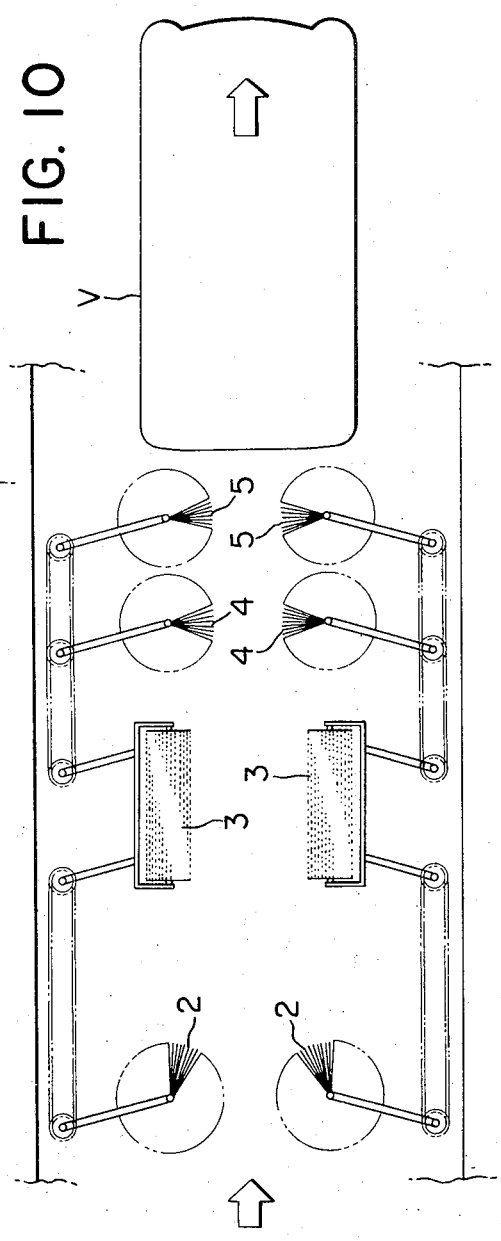

WASHING BRUSH OPERATION SYSTEM FOR A CONTINUOUSLY OPERATIVE CAR WASHING APPARATUS

BRIEF SUMMARY OF THE INVENTION

The present invention relates to the washing system for a continuously operative car, especially motor car washing apparatus.

In a conventional type of continuously operative car washing apparatus which is used in washing a car continuously, the apparatus has an arrangement of roof brushes, side brushes and wheel brushes, etc., to wash each portion of a car in predetermined order. Electric or liquid automatic control means make these brushes follow any concave or convex surface of the body or the wheels of a car.

But the control means has often been in trouble with submersion of washing water or rain water thereinto, and danger of electric leakage would have occurred if the means is an electric one, because the apparatus is usually used with a lot of washing water and is often used out of doors.

Each wheel brush is supported on a brush arm which is hard and of small diameter, and it is difficult to control operation of the brush to smoothly contact the surface of the body of the car without any contact between the hard brush arm and the body of the car. Therefore, there is the possibility that the hard brush arm would contact the body surface of the car and damage it.

The object of the present invention is to provide a washing brush operation system for a continuously operative car washing apparatus in which side brushes and wheel brushes are mechanically operated to follow the concave or convex body surface of a car without use of any electric or fluid control means whereby the system is assured of safety, free of trouble and low cost.

Another object of the present invention is to provide a washing brush operation system for a continuously operative car washing apparatus in which washing brushes are automatically rearranged in the most proper configuration to follow the body surface of a car of any size, and to provide effective brushing operation.

A further object of the present invention is to provide a washing brush operation system for a continuously operative car washing apparatus in which a wheel brush is moved toward its open position dependent on movement of the first side brush at forward position against the wheel brush toward the same direction. The wheel brush is moved toward its closed position dependent on movement of the second side brush at backward position against the wheel brush toward the same direction, so that the hard arm of the wheel brush never contacts with the body surface of a car so as not to injure or damage it.

BRIEF DESCRIPTION OF THE DRAWING

FIG. 5–10 respectively show different washing processes of the apparatus shown in FIG. 1.

DETAILED DESCRIPTION

Figure 1:
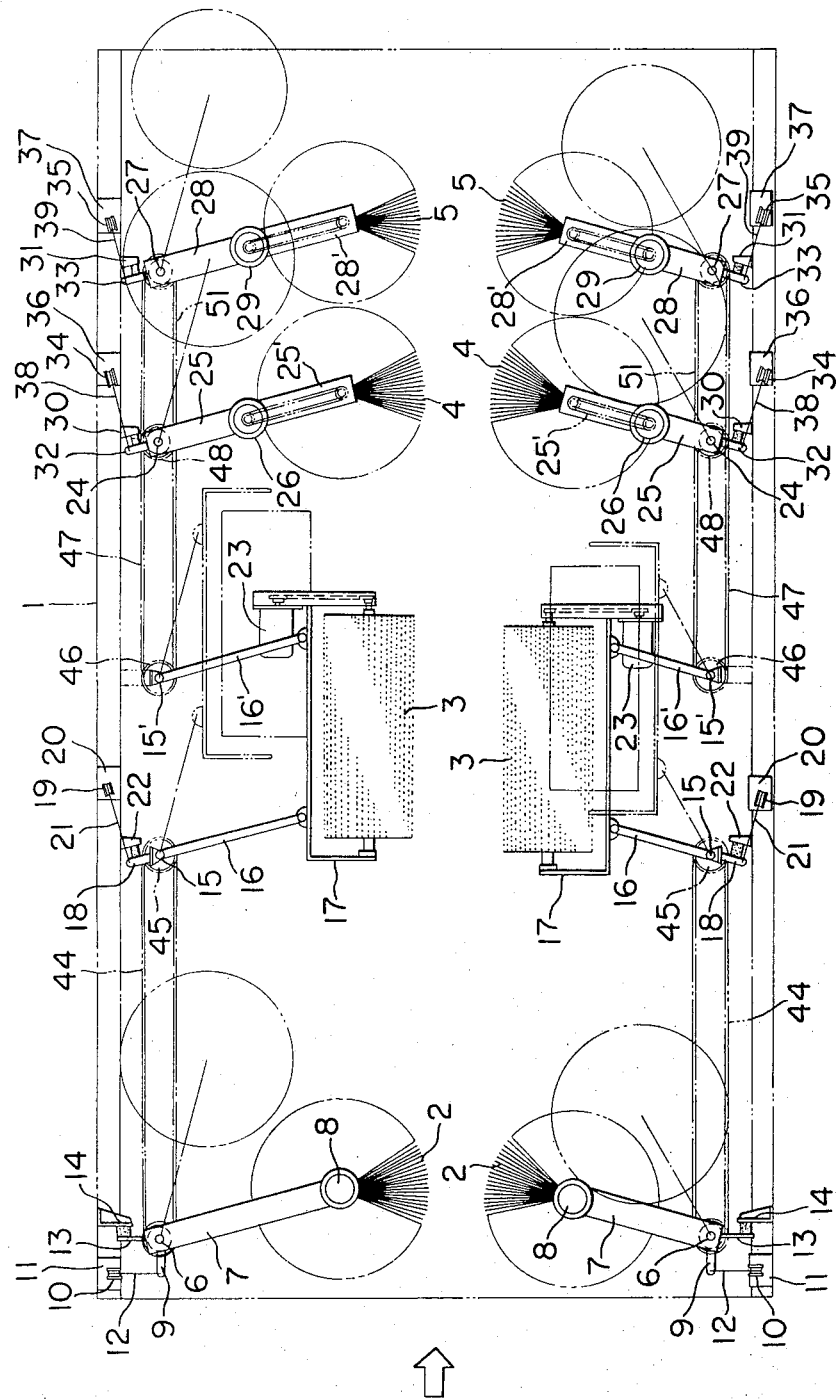
FIG. 1 is a cross-sectional plan view of an embodiment of the invention.
Figure 2:
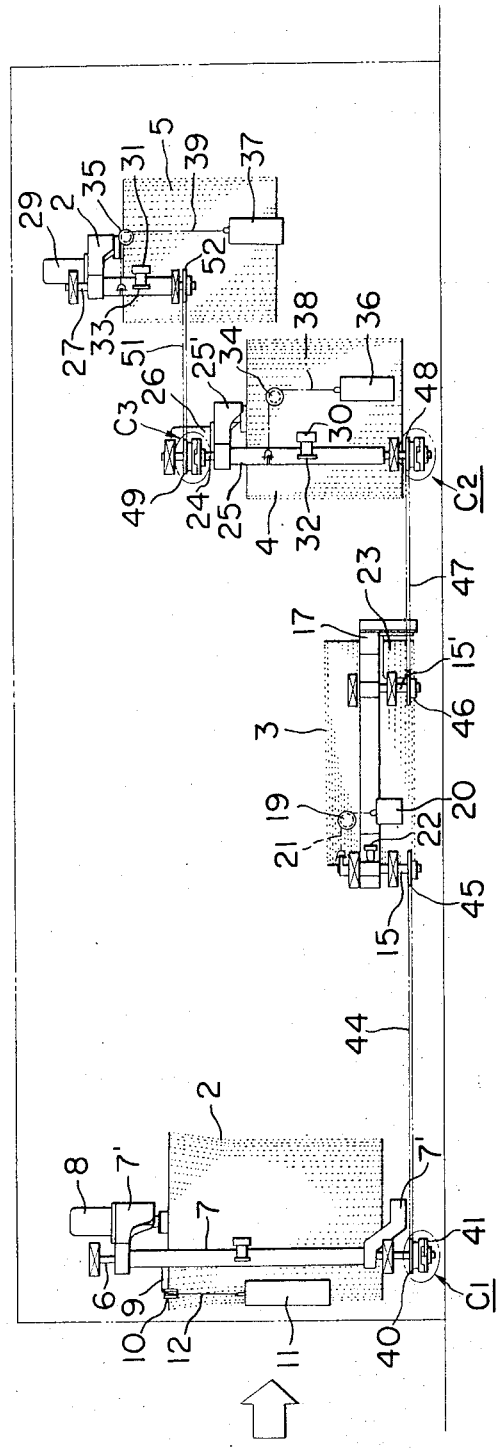
FIG. 2 is a partial cross-sectional side elevation view of the embodiment shown in FIG. 1.

Referring to FIG. 1 and FIG. 2, therein is seen a gate type frame 1 which is formed to pass a car therethrough. The inner side walls of the frame 1 have a pair of first side brushes 2, 2 on its forward portion, a pair of wheel brushes 3, 3 on its middle portion, a pair of second portion and a pair of third brushes 4, 4 on its backward 5, 5 behind the second brushes 4, 4, so that each of them can be swung around a vertical axis at the root portion thereof.

Explaining one of the pair of first side brushes, the vertically elongated first supporting shaft 6 is supported on the inner side wall of the frame 1, on which the root portion of the fork-shaped first brush arm 7 is pivotally supported. And the cylindrical first side brush 2 is rotatably supported between the pair of horizontal arms 7', 7' of the brush arm 7 so as to be rotated around its vertical axis by a motor 8 settled on the first brush arm 7.

The first brush arm 7 has a protrusion 9 projecting therefrom at its root portion. A wire 12, one end of which is fixed to the tip portion of the protrusion 9, is elongated over a pulley 10 rotatably supported on the frame 1, in downward direction to hang up a weight 11 at the other end thereof.

Moreover, the root portion of the first brush arm 7 has a restricter 13 to contact with a stopper 14 settled on the frame 1, whereby the weight 11 acts on the first brush arm 7 to swing toward its closed position until the restricter 13 contacts with the stopper 14, and keeps the first side brush 2 at its waiting position for a car as shown in FIG. 1 with solid lines.

Explaining now one of the pair of wheel brushes 3, 3, a pair of short shafts 15, 15', are pivotally supported on the middle portion of the inner side wall of the frame 1 to be horizontally separated from each other. These short shafts fixedly support the root portion of link arms 16, 16', respectively, keeping them parallel to each other. A brush frame 17 supporting the wheel brush 3 rotatably around a horizontal axis, is pivotally connected to each end portion of the link arms 16, 16'. Thus, the frame 1, the link arms 16, 16' and the brush frame 17 form a parallel link mechanism, so that forward and backward swing of the link arms 16, 16' around the short shafts 15, 15' make the brush frame 17 and the wheel brush 3 swing while keeping their parallel relation to the frame 1.

The link arm 16 has a protrusion 18 which is to contact a stopper 22 settled on the side wall of the frame 1. A wire 21, one end of which is attached to the protrusion 18, is elongated over a pulley 19 rotatably settled on the side wall of the frame 1, and in downward direction to hang up a weight 20 at the other end thereof, so that the weight 21 swings the link arms 16, 16' toward its closed position until the protrusion contacts the stopper 22 as shown in FIG. 1 with solid lines. The wheel brush 3 is swung in a horizontal plane by a motor 23 settled on one side of the brush arm 17.

Explaining next each one of the pairs of second side brushes 4, 4 and the third side brushes 5, 5, the inverted L - shaped second brush arm 25 is fixedly connected to the vertical second supporting shaft 24 rotatably supported to the lower portion of the inner side wall of the frame 1. The second side brush 4 is rotatably supported on the horizontal arm 25' of the second brush arm 25 so that the second side brush 4 is rotated around a vertical axis by a motor 26 settled on the second brush arm 25.

Moreover, the vertical third supporting shaft 27 is rotatably supported on the upper portion of the inner side wall of the frame 1. The third supporting shaft 27 fixedly supports the third brush arm 28 of which horizontal arm 28' rotatably supports the third side brush 5 to be rotated by a motor 29 settled on the third brush arm 28.

The second side brush 4 mainly washes the skirt portion of a car while the third side brush 5 mainly washes the window portion of a car. The second brush arm 25 and the third brush arm 28 respectively have protrusions 32 and 33 to respectively contact stoppers 30 and 31 each settled on the inner side wall of the frame 1. A pair of wires 38 and 39, each one end of which are respectively attached to the tip portions of the protrusion 32 and 33, are respectively elongated over pulleys 34 and 35, in downward direction to hang up weights 36 and 37, so that the weights 36 and 37 respectively swing the second brush arms 25 and 28 toward their closed positions to keep the side brushes 4 and 5 at their waiting positions for a car.

Figure 3:
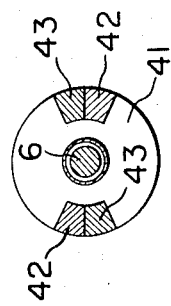
FIG. 3 is partially cross-sectioned side elevation view of a clutch mechanism used in the apparatus shown in FIG. 1.
Figure 4:
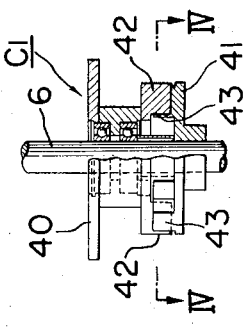
FIG. 4 is a lateral cross-sectional plan view taken along the line IV—IV of FIG. 3.

The first supporting shaft 6, supporting the first side brush 2, is mechanically connected to the short shaft 15 supporting the wheel brush 3. Explaining the structure of the connecting mechanism, the first supporting shaft 6 has a clutch mechanism $C_1$ at the lowermost portion thereof, which has a sprocket wheel 40 rotatably supported thereon and a clutch plate 41 fixedly supported thereon under the sprocket wheel 40 as shown in FIG. 3 and FIG. 4. The sprocket wheel 40 has a couple of engagement pieces 42, 42 positioned diametrically on the concave lower end surface thereof, while the clutch plate has a couple of nails 43, 43 to engage with the engagement pieces 42, 42, diametrically positioned on the upper end surface thereof.

Thus, referring to FIG. 3 and FIG. 4, torque occurring with clockwise rotation of the first supporting shaft 6, is transferred to the sprocket wheel 40 through the clutch plate 41 with engagement between the engagement pieces 42, 42 and the nails 43, 43, while torque occurring with counterclockwise rotation of the first supporting shaft 6, is canceled so as not to transfer to the sprocket wheel 40 as a result of separation the engagement pieces 42, 42 from the nails 43, 43 within the angle of 180°. Rotation of the sprocket wheel 40 is transferred to a sprocket 45 fixedly supported on the short shaft 15 of the wheel brush 3 by means of an endless chain 44, whereby torque occurring with clockwise rotation of the first supporting shaft 6, is transferred to the short shaft 15.

The second supporting shaft 24 of the second side brush 4 has a clutch mechanism $C_2$ at its lowermost portion and a clutch mechanism $C_3$ at its uppermost portion, each of which has the same structure as the clutch mechanism $C_1$. The sprocket 46 fixedly supported on the lowermost portion of the short shaft 15' of the wheel brush 3 connects with the sprocket 48 of the clutch mechanism $C_2$ by means of an endless chain 47, so that torque occurring with rotation of the second supporting shaft 24 in one direction, is transferred to the short shaft 15' through the clutch mechanism $C_2$. Accordingly, the wheel brush 3 is swung toward its closed position dependent on the swing of the second side brush 4 toward its closed position.

Moreover, the sprocket 49 of the clutch mechanism $C_3$ supported on the uppermost portion of the second supporting shaft 24 of the second side brush 4, connects with a sprocket 52 fixedly supported on the lowermost portion of the third supporting shaft 27 of the third side brush 5 by means of an endless chain 51, so that torque occurring with rotation of the second supporting shaft 24 in one direction, is transferred to the third supporting shaft 27 of the third side brush 5. Accordingly, the third side brush 5 is swung toward its open position dependent on the swing of the second side brush 4 toward its open position, and is swung toward its closed position independent of the swing of the second side brush 4 toward its closed position.

In operation, referring to FIG. 5–FIG. 10, at first each pair of the brushes 2, 2, 3, 3, 4, 4 and 5, 5 are rotatingly driven to allow a car V to pass through the gate type frame 1 (FIG. 5). The car V then contacts the pair of first side brushes 2, 2 on the front surface thereof to swing the brushes 2, 2 toward their open position against the biased force applied to the brushes 2, 2 by the weights 11, 11, and at the same time to swing the pair of wheel brushes 3, 3 toward their open position against the biased force applied the brushes 3, 3 by the weights 20, 20 (FIG. 6). Thus, the first side brushes 2, 2 follow the front surface and the side surface of the car V while the car V goes ahead, brushing the surfaces of the car V.

Resulting from further advancement of the car V, pair of the wheel brushes 3, 3 in their open position, contact the front wheels and the rear wheels of the car V with aid of the biased force applied to the brushes 3, 3 the weights 20, 20, to brush them.

When the pair of second side brushes 4, 4 contact the side surface of the car V, these brushes 4, 4 are swung toward their open positions by the pushing force of the car V, and at the same time the third side brushes 5, 5 are swung toward their open positions with operation of the clutch mechanisms $C_2$ and $C_3$, so that the second side brushes 4, 4 brush the skirt portion of the car V and the third side brushes 5, 5 brush the window portion of the car V.

Figure 7:
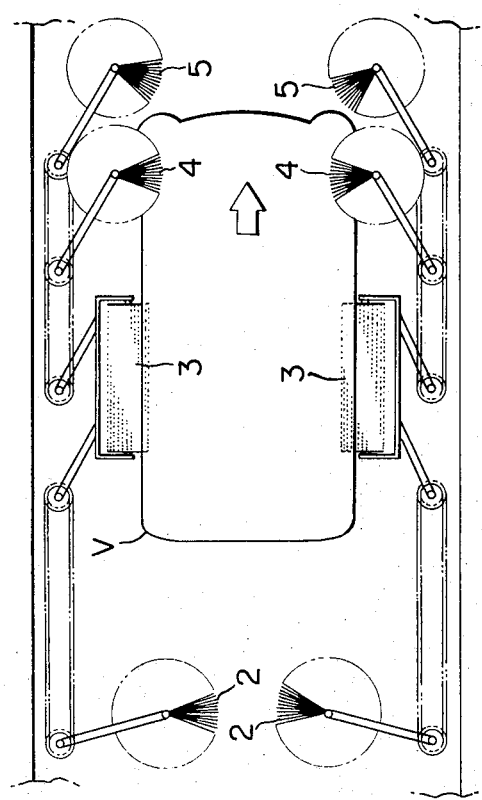
Figure 8:
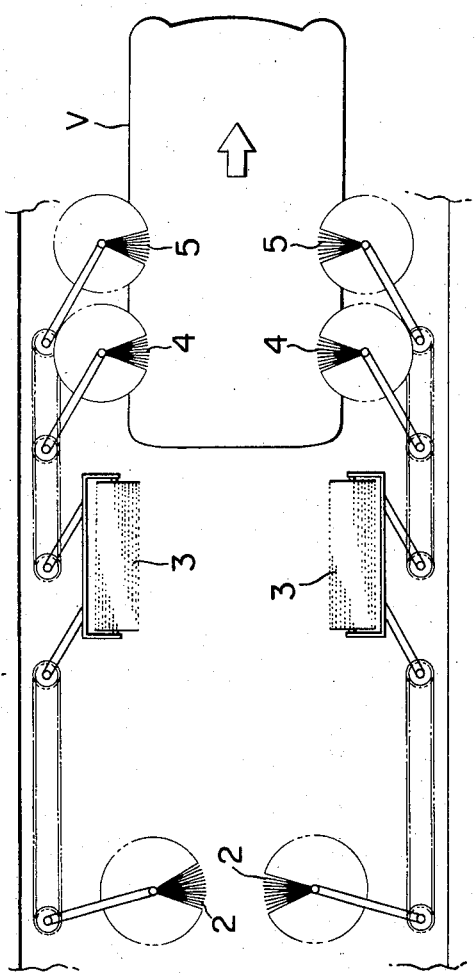

At this time, the first side brushes 2, 2 move away from the car V, and are swung toward their closed positions independent of the other brushes, because the connection between the first supporting shafts 6, 6 and the wheelbrushes 3, 3 is canceled with operation of the clutch mechanism $C_1$ (FIG. 7). But if the wheel brushes 3, 3 move away from the car V after the car V went further ahead, the brushes 3, 3 are kept at their open position with operation of the clutch mechanism $C_2$, whereby any surface of the car V is protected from the hard portion of the brush frame 17 so as not to be injured or damaged by the brush frame 17 (FIG. 8).

As soon as the second side brushes 4, 4 move away from the surface of the car V after the car advanced further, the brushes 4, 4 are swung toward their closed positions, and at the same time the wheel brushes 3, 3 are swung from their open positions to closed positions dependent on swinging of the brushes 4, 4 with operation of the clutch mechanisms $C_2$, $C_3$ (FIG. 9).

At the last time, the third side brushes 5, 5 move away from the car V, and these brushes are swung toward their closed positions independent of the other brushes (FIG. 10). Thus, a brushing process for washing the car V has been performed, and all of the brushes 2, 2, 3, 3, 4, 4 and 5, 5 are returned to their waiting positions for a following car as shown in FIG. 5.

I claim:

1. A washing brush system for a continuously operative car washing apparatus comprising a first side brush supported on a frame by a brush arm swingable around a vertical axis, a wheel brush supported on said frame at a backward position against said first side brush by a brush arm swingable around a vertical axis, and coupling means including a clutch mechanism for swinging said wheel brush toward an open position in dependence on the swinging of said first side brush toward a respective open position, said wheel brush swinging toward a closed position independent of the swinging of said first side brush toward a respective closed position.

2. A washing brush system for a continuously operative car washing apparatus according to claim 1 including a second side brush supported on said frame at a backward position against said wheelbrush by a second brush arm swingable around a vertical axis, said wheel-brush being swung toward said closed position in dependence on the swinging of said second side brush toward a respective closed position.

3. A washing brush system for a continuously operative car washing apparatus according to claim 1, wherein said clutch mechanism comprises a disc-shaped clutch plate member having a pair of projections diametrically positioned thereon, said plate member being turnable around said vertical axis with said brush arm, and a sprocket member having a pair of diametrically positioned engagement elements for engaging said projections, said sprocket member being turnable relative to said clutch plate member around said vertical axis, whereby turning of said sprocket member around said vertical axis in one direction is restricted by engagement of said projections and elements, said sprocket member being freely turnable around said vertical axis in the other direction within an angle of 180°.

* * * * *